June 2, 1964     D. E. GOLAY     3,135,436
BULK FEED STORAGE AND DISPENSER
Filed Sept. 18, 1961     3 Sheets-Sheet 1

INVENTOR
DONAVEN E. GOLAY
BY Herbert A. Weinstein
ATTORNEY

June 2, 1964  D. E. GOLAY  3,135,436
BULK FEED STORAGE AND DISPENSER
Filed Sept. 18, 1961  3 Sheets-Sheet 2
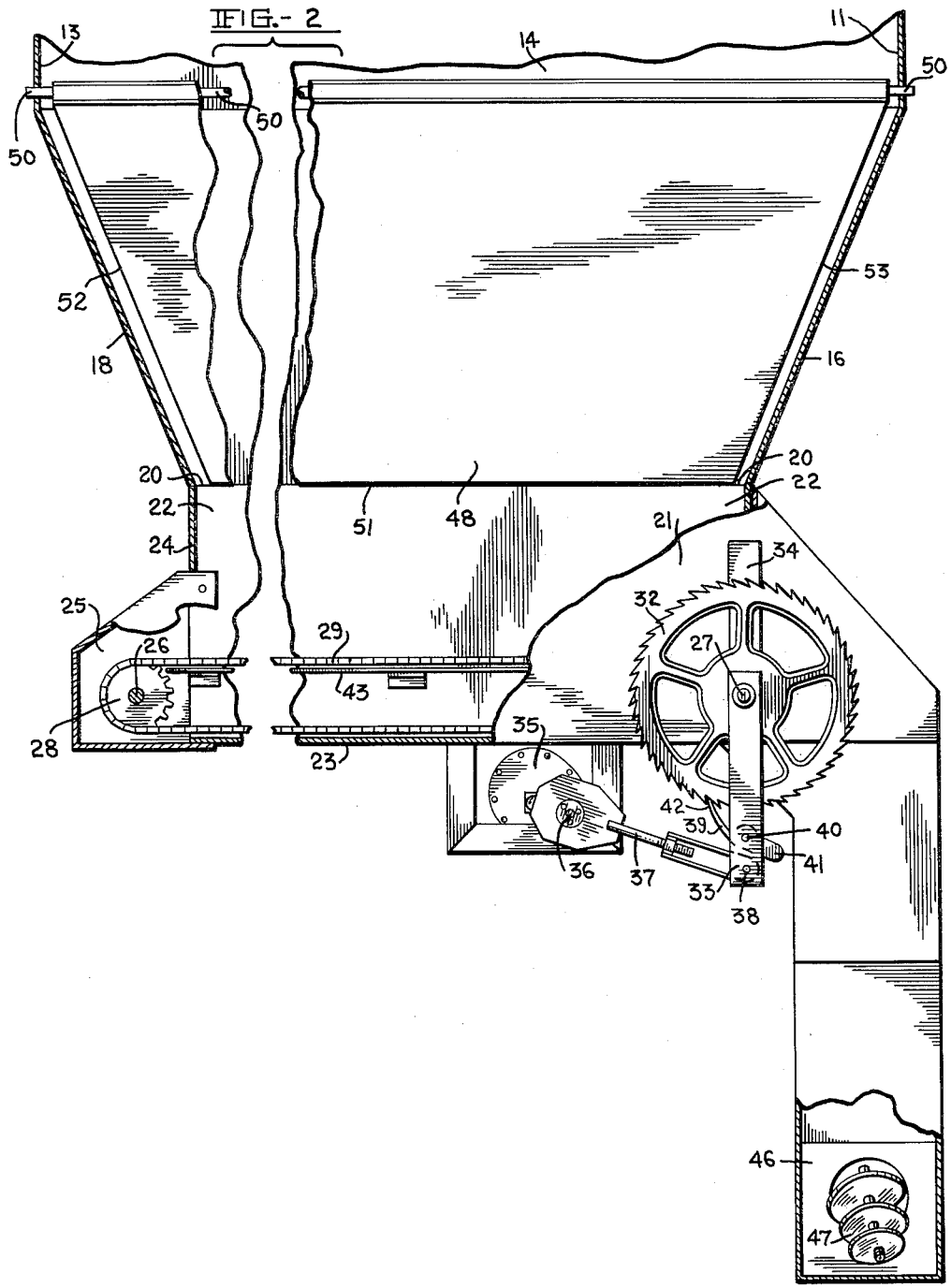
INVENTOR
DONAVEN E. GOLAY
BY Herbert A. McIntyre
ATTORNEY June 2, 1964 D. E. GOLAY 3,135,436
BULK FEED STORAGE AND DISPENSER
Filed Sept. 18, 1961 3 Sheets-Sheet 3
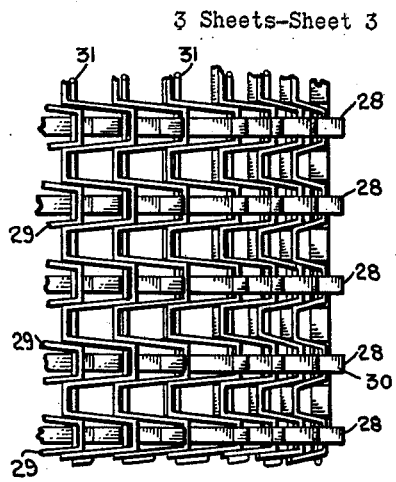
FIG.- 4
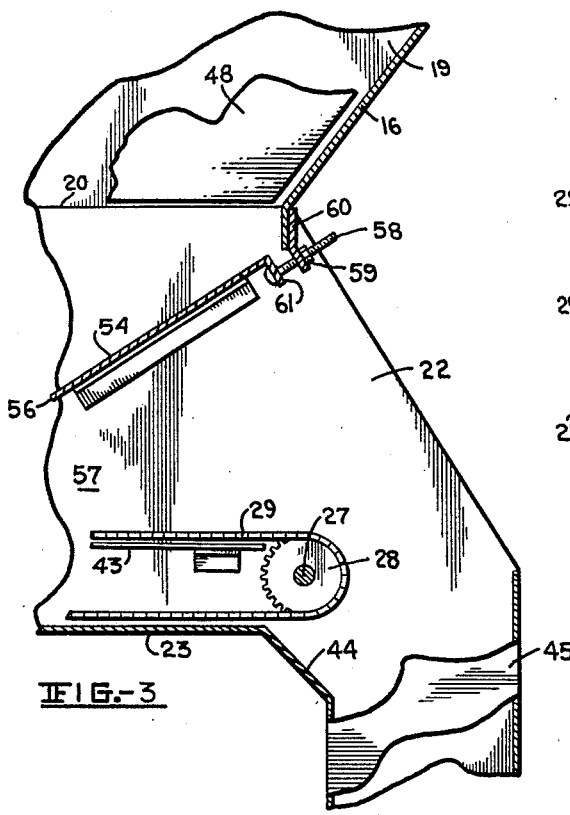
FIG.-3
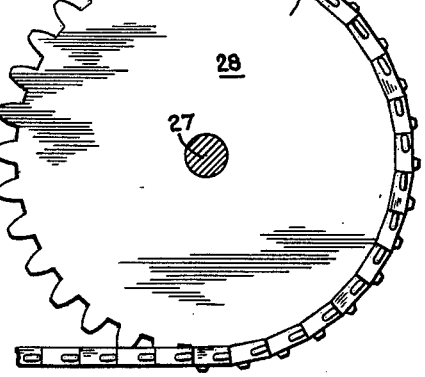
FIG. 5
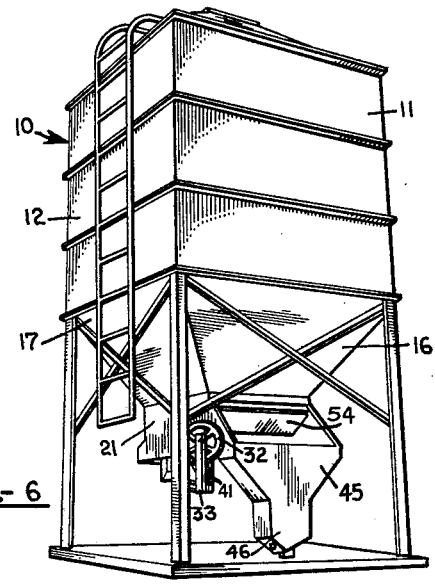
FIG.- 6
INVENTOR
DONAVEN E. GOLAY
BY Herbert A. Minturn
ATTORNEY

United States Patent Office 3,135,436
Patented June 2, 1964

3,135,436
BULK FEED STORAGE AND DISPENSER
Donaven E. Golay, Cambridge City, Ind., assignor to Golay & Co., Inc., Cambridge City, Ind.
Filed Sept. 18, 1961, Ser. No. 138,730
3 Claims. (Cl. 222—328)

This invention relates to a bulk feed storage tank and dispensing means at the lower end of the tank. While the tank has been primarily designed to receive and dispense bulk feed, such as ground feed, it may of course be used for storage and dispensing of other particulate or comminuted material. One material which is normally difficult to feed down through a storage bin or tank and to be dispensed from the lower end thereof is a cattle feed comprising of coarsely ground corn and other grains, including ground corn cobs and husks and the like, and which material has been treated with molasses.

Particular advantages of the invention herein to be set out are that the material feeds downwardly through the tank as it is withdrawn from the bottom of the tank; that there is little or no tendency for the material to bridge over in the tank with the resultant loss of downward feeding; and the material may be fed outwardly from the bottom of the tank in a uniform manner wherein the dispensing means aids in downward feeding of the material within the tank itself.

These and other purposes and advantages of the invention will become apparent to those versed in the art in the following description of one particular form of the invention as illustrated in the accompanying drawings, in which FIG. 1 is a view in front elevation and partial section of a fragmentary portion of the structure embodying the invention;

FIG. 2 is a view in side elevation and partial of that part of the structure shown in FIG. 1;

FIG. 3 is a view on an enlarged scale of a detail of the dispensing means;

FIG. 4 is a top plan view of a fragmentary end portion of a belt feeder;

FIG. 5 is a detail on an enlarged scale in end elevation and partial section of the belt drive sprocket; and FIG. 6 is a view in reduced scale and in front perspective of the overall structure embodying the invention.

Figure 1:
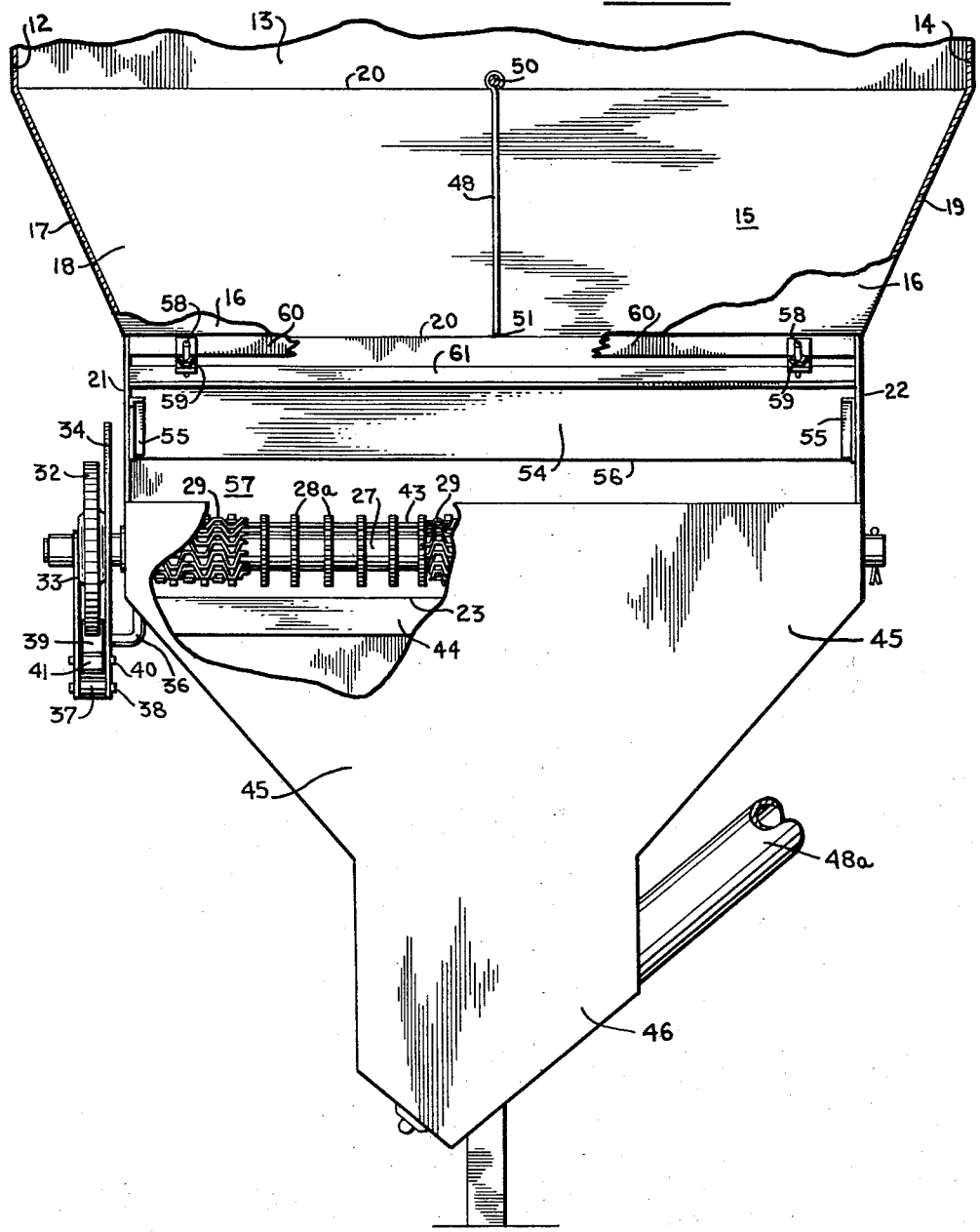

A bin or what will hereinafter be termed a tank 10 is, in the present form, rectangular in horizontal section defined by four substantially vertically disposed side walls 11, 12, 13, and 14. The lower ends of these four walls blend into the base ends of a hollow, inverted, truncated pyramid generally designated by the numeral 15. The lower end of this truncated pyramid 15 is entirely open, being at the opening of a cross-sectional area less than that of the area of the opening between the tank walls 11, 12, 13, and 14. These truncated pyramid walls are defined respectively by the numerals as follows—16 (at the front), 17, 18, and 19. The upper ends of these walls 16, 17, 18, and 19 interconnect with the tank walls 11, 12, 13, and 14 respectively in a common plane horizontally disposed and including the junction line 20.

A substantially vertical wall 21 extends downwardly from the lower end of the wall 17. An opposite wall 22 extends downwardly from the lower end of the wall 19 also to be substantially vertical, and a floor 23 joins the lower ends of these vertical walls 21 and 22. The base at the rear ends of these two side walls 21 and 22 is closed by a wall 24 which extends vertically downwardly from the wall 18 a short distance, thence diagonally downwardly and rearwardly, then vertically downwardly, and finally horizontally back to join the floor 23. This leaves an offset enclosure 25 rearwardly of the vertical portion of the wall 22, FIG. 2.

A shaft 26 extends horizontally across this enclosure 25 to be journaled at the two side walls 21 and 22. A shaft 27 extends between the two side walls 21 and 22 at the forward end portions thereof to be journaled at those two walls.

A plurality of sprockets 28 are fixed to each of these shafts 26 and 27 in spaced apart relation therealong. A reticular, endless belt 29 is trained around the two shafts 26 and 27 so that the teeth 30 of the sprockets engage through openings in the belt 29. As indicated particularly in FIG. 4, the belt 29 is presently made out of flat wire having a zig-zag formation, through the loops of which a hinge rod 31 is passed all as is indicated in FIG. 4, and as found in commercial belts obtainable upon the markets. The teeth 30 of the sprocket bear against the interconnecting rods or wires 31, FIG. 5, in the passage around the driving sprockets 28a. The sprockets on the shaft 26, in the present construction, are not drive sprockets. The drive sprockets 28a are fixed on the shaft 27.

The shaft 27 extends outwardly beyond the outside of the side wall 21 and has fixed thereon a ratchet wheel 32. A pair of rocker arms 33 and 34 are rockably carried by the shaft 27, one arm on each side of the ratchet wheel 32, FIG. 1.

A motor 35 is mounted below the floor 23 and drives a crank 36. A connecting rod 37 leads from the crank 36 to enter between the rockers 33 and 34 and be pivotally connected thereto on the pin 38. A pawl 39 is rockably swung between the rockers 33 and 34 in any suitable manner, such as on the pin 50. The pawl 39 has a counterweight 41 causing the pawl 39 to swing by one end upwardly into the path of the teeth of the ratchet wheel 32, FIG. 2. The tooth engaging end 42 of the pawl 39 is directed rearwardly and upwardly so that when the motor 35 is in operation, the connecting rod 37 will reciprocate the arms 33 and 34 to pull the pawl 39 rearwardly and thus turn the wheel 32 in a clockwise direction, FIG. 2, for a distance depending upon the stroke of the crank 36. This drive of the wheel 32 is effected upon each revolution of the crank 36. The speed of this crank 36 is normally reduced below the speed of the motor armature, such as through a gear reduction (not shown).

Each partial turning of the wheel 32 by the pawl 39 transmits a like intermittent motion to the belt 29 to cause the upper flight of the belt to advance forwardly intermittently. A sub-floor 43 is carried between the side walls 21 and 22 immediately under the upper flight of the belt 29, FIG. 2. This floor 43 lies between the shafts 26 and 27, terminating at the forward end, FIG. 3, just out of range of the teeth 30 on the sprockets 28. Normally the belt 29 will drag across in contact with the subfloor 43 under the weight of feed thereabove. The floor 23 preferably has a front terminal downwardly inclined portion 44 which leads into the vertical feed collector box 45 terminating in a lower boot 46. Feed is lifted and conveyed to any desired location from this boot 46. One particular conveying means consists of an auger type conveyor 47 within a tube 48a. This conveying means, being old in the art, is not herein shown in detail.

In view of the narrowing mouth effect through this pyramidal formation, the feed tending to drop by gravity therein tends to become compacted by the reduction in area thus produced as between the rectangular upper tank walls and the lower inwardly sloping walls. This in itself in many instances would tend to induce a bridging effect whereby the feed would arch over to bear by side portions thereof on these sloping walls with a result that the feed thereunder would be fed out and no further feed would drop down to the belt 29. In order to overcome that possibility, particularly when there is molasses mixed in the feed, although some dry feeds will normally tend to bridge, a baffle 48 is freely, rockably suspended within the pyramidal part of the tank by a rod or bar 50 extending by opposite ends through opposite walls of the tank, and around which bar 50 the upper end of the baffle 48 is wrapped for free rocking of the baffle. In the form herein shown, this bar 50 extends between the walls 11 and 13, centrally between the walls 12 and 14. The plane of the free hanging baffle 48 extends approximately perpendicular to and in a fore and aft direction over the belt 29, the lower edge of the baffle 48 terminating substantially in the plane across the lower ends of the walls 16, 17, 18 and 19. Thus, the lower edge 51 of the baffle 48 is spaced a distance above the belt 29, FIGS. 1 and 2. Also this baffle 48 has its side edges 52 and 53 spaced a slight distance from the walls 16 and 18 as indicated in FIG. 2.

The walls 21 and 22, at their front ends, are spaced apart a distance approximately equal to the width of the belt 29. In order to vary the opening thus had between these two side walls and over the belt 29, a valve plate 54 is positioned between the two walls 21 and 22, FIG. 3, the plate 54 slides diagonally on any suitable means, such as a short length of angle iron 55, this valve plate 54 being so mounted between the side walls 21 and 22 as to afford a partial closure of this opening. The rear lower edge 56 of the plate 54 thus provides a throat between that and the belt 29 and the wall sides 21 and 22 through which material stored in the tank 10 may be withdrawn over the belt 29. The vertical height of this throat designated by the numeral 57 may be increased or decreased by appropriate movement of the plate 54 over the brackets 55. This may be effected in any suitable manner, herein shown as by a bolt 58 hanging on a nut 59 on a bracket 60. The plate 54 is preferably provided with a downwardly turned flange 61 to which the head of the bolt 58 is secured.

*Operation*

Assuming that the tank 10 is filled with the material to be stored and dispensed, this material will drop by gravity downwardly within the tank 10 down into the lower pyramidal end thereof to be on both sides of the baffle plate 48 and to rest on the belt 29. No material will flow from the tank over the belt 29 into the collector 45 until the belt 29 is set into operation by energization of the motor 35 to intermittently turn the ratchet wheel 32 and hence intermittently advance the belt 29 forwardly under the plate 54.

Since the belt 29 is reticulated, and the depth of the openings in the belt is sufficient to permit the material to drop therein in part at least as it bears on the belt 29, the material will be advanced by a thin layer at least directly in contact with the belt 29 to be discharged over the front end and to drop into the collector 45 down into the boot 46. The sub-floor 43 prevents the material from dropping entirely through the belt, and retains the material in a more or less interlocked condition tending through friction to carry uppermost portions of the material in contact with the material directly on the belt 29. There will be a zone reached vertically, where the tendency to pull the material along with the belt 29 is quite reduced, particularly above the edge 56 of the plates 54. However the intermittent stopping and starting and traveling of the belt 29 tends to shake down the material thereabove to bring it into compressive contact with the belt 29 for engagement therewith and therefore for travel therealong.

As this material is fed out by the belt 29, the material in the tank 10 above the line 20 drops downwardly to feed down in between the walls 21 and 22 as above indicated. In view of the intermittent drive of the belt 29, there will not be much possibility of the material bridging between the walls of the pyramidal base in the fore and aft directions. However there may be a slight tendency for this material to bridge laterally of that direction, that is transversely of the plane of the baffle 48. Any bridging has to be between two opposite walls, and in this case the baffle 48 constitutes a central wall which may swing laterally of the belt 29. Thus a bridging on one side of the baffle 48 against the opposite wall would tend to swing that baffle 48 and thus eliminate a support for one side of the "bridge" and allow the material to drop downwardly. It only takes a slight movement of the baffle 48 to effect this release of a tendency to bridge. The same action is had should there be a tendency to bridge on the other side of this baffle 48. Thus in combination with the intermittent drive of the belt 29 affording a positive engagement with the material, tending to shake the material downwardly, and with the swinging baffle 48 thereabove, this combination very successfully combats bridging of the material.

Therefore while the invention has been shown in more or less minute detail, it is obvious that structural variations may be employed without departing from the spirit of the invention, and I therefore do not desire to be limited to that precise form beyond the limitations which may be imposed by the following claims.

I claim:

1. Means for discharging a particulate material from a storage tank having upper vertical side walls, and lower end walls continuing therefrom sloped inwardly to define an inverted, truncated pyramid having a discharge opening across its lowermost end, comprising
    a floor spaced below and across said opening;
    a reticulated belt having a flight supported by said floor;
    means intermittently moving said belt flight across said floor;
    a planar baffle centrally disposed within and across said pyramid;
    means freely swingably supporting said baffle to allow it to hang downwardly within the pyramid, defining an axis of rotation parallel with the direction of travel of said belt flight, the axis being located at the upper wide end of the pyramid; and
    said baffle being shaped to have said edges spaced from and sloped in approximate parallelism with the opposite side walls of said pyramid allowing free swinging of the baffle therebetween to assume normally a vertically disposed position.

2. The structure of claim 1, in which the lower edge of said baffle extends to a plane including the lower ends of the walls of said pyramid.

3. The structure of claim 1, in which
    said baffle divides said material as it may drop into two approximately equal volumes within said pyramid;
    said baffle hangs vertically unrestrained against rocking until lateral pressure of the material in one of said volumes varies from that of the other volume; and
    said belt moving means imparts a starting jerk on said belt at the beginning of each of its intermittent drive inducing a movement of said material longitudinally of said baffle tending to equalize said pressures.

References Cited in the file of this patent

UNITED STATES PATENTS

| | | |
|---|---|---|
| 849,594 | Bradford | Apr. 9, 1907 |
| 1,070,798 | Green et al. | Aug. 19, 1913 |
| 1,448,760 | Martin | Mar. 20, 1923 |
| 1,551,702 | Schaffer | Sept. 1, 1925 |
| 2,293,160 | Miller et al. | Aug. 18, 1942 |
| 2,420,343 | Albertoli | May 13, 1947 |
| 2,478,583 | Hybbert | Aug. 6, 1949 |
| 2,963,144 | Wognum | Dec. 6, 1960 |